United States Patent [19]

Moran

[11] Patent Number: 5,238,434
[45] Date of Patent: Aug. 24, 1993

[54] TEXTURED BOTTOM SKIN FOR BODYBOARDS AND METHOD

[75] Inventor: Steven M. Moran, Seal Beach, Calif.

[73] Assignee: Kransco, San Francisco, Calif.

[21] Appl. No.: 670,022

[22] Filed: Mar. 15, 1991

[51] Int. Cl.$^5$ ............................................. B32B 31/14
[52] U.S. Cl. ........................................ 441/74; 114/288
[58] Field of Search ................... 441/65, 67, 74, 79, 441/129; 272/1 B, 32; 280/14.2, 609; 114/56, 62, 67 R, 288, 271, 361; D12/300, 309, 307; D21/228, 230, 236–238

[56] References Cited

U.S. PATENT DOCUMENTS

| | | | |
|---|---|---|---|
| D. 183,016 | 6/1958 | O'Herron | D21/228 |
| D. 258,516 | 3/1981 | Slingerland | 441/74 |
| 632,738 | 9/1899 | O'Hara | 114/67 |
| 670,995 | 4/1901 | Moore | 114/67 |
| 1,352,998 | 9/1920 | Thompson | 114/67 R |
| 2,875,720 | 3/1959 | Hupp | 114/62 |
| 3,276,050 | 10/1966 | Edwards | 441/74 |
| 3,378,274 | 4/1968 | Poppen | 280/18 |
| 3,732,839 | 5/1973 | Schuster | 114/67 R |
| 3,814,417 | 6/1974 | Catlin | 272/56.5 |
| 3,918,114 | 11/1975 | Schmitt | 280/609 |
| 3,937,482 | 2/1976 | Johnson | 280/18 |
| 4,118,050 | 10/1978 | Schnurrenberger | 441/68 |
| 4,375,199 | 3/1983 | Graeme-Barber | 114/67 R |
| 4,406,628 | 9/1983 | Rademacher | 434/254 |
| 4,533,150 | 8/1985 | Hardy | 280/12 H |
| 4,561,664 | 12/1985 | Cashmere | 280/18 |
| 4,562,784 | 1/1986 | Lineback | 114/162 |
| 4,571,195 | 2/1986 | Brooks, Jr. | 441/74 |
| 4,603,650 | 8/1986 | Bjorn | 114/288 |
| 4,666,171 | 5/1987 | Sellers | 280/18 |
| 4,706,910 | 11/1987 | Walsh | 114/67 R |
| 4,752,260 | 6/1988 | Stewart | 441/65 |
| 4,878,980 | 11/1989 | Stedman | 156/299 |
| 5,052,963 | 10/1991 | Johnson | 441/68 |

FOREIGN PATENT DOCUMENTS

| | | | |
|---|---|---|---|
| 3625413 | 2/1988 | Fed. Rep. of Germany | 441/74 |
| WO80/01673 | 8/1980 | PCT Int'l Appl. | 114/67 R |
| 357637 | 9/1931 | United Kingdom | 114/67 R |

OTHER PUBLICATIONS

Pp. 32, 33 and 50 from "Boats," Mar. 1960.

Primary Examiner—Robert J. Oberleitner
Assistant Examiner—Clifford T. Bartz
Attorney, Agent, or Firm—Kolisch, Hartwell, Dickinson, McCormack & Heuser

[57] ABSTRACT

A textured bottom surface is provided for bodyboards of the type which have a semi-rigid foam core and which are used to ride on waves such as ocean surf with the rider in a prone or procumbent position. The improved bottom surface comprises a plurality of discreet depressions formed in the bottom of the bodyboard, numbering at least 50-depressions over the entire bottom surface, and preferably numbering more than 1500 such depressions. The depressions are believed to generate bubbles in the air-water mixture passing beneath the board which help reduce the shear forces in the water. The effect is called air lubrication and results in reduced drag and greater speed, as well as a lighter "feel" for the board on water. A bodyboard incorporating the improved bottom surface, and a bottom skin for bodyboards which includes the texturing depressions, are disclosed. A method of forming the textured bottom skin is also disclosed.

18 Claims, 4 Drawing Sheets

TEXTURED BOTTOM SKIN FOR BODYBOARDS AND METHOD

BACKGROUND AND SUMMARY OF THE INVENTION

The invention relates generally to sporting goods and recreational products, and more particularly to bodyboards for riding on waves such as ocean surf.

Bodyboards are flotation amusement devices for riding waves. They are similar to surfboards, with the major difference being that bodyboards are shorter, lighter and generally more flexible than surfboards. In form, a bodyboard is a contoured, elongated, semi-rigid foam plank having a top riding surface and a bottom surface covered with a plastic bottom skin which is generally slick and somewhat stiff for planing on water.

Speed and maneuverability are important attributes of bodyboards. The bottom skin which forms the bottom surface of a bodyboard is made from a relatively hard, non-foam, plastic material which is employed partly because it is "slippery" and helps reduce drag. Low bottom surface drag is especially desirable because it increases the speed of the bodyboard and helps when performing the tricks and maneuvers which make bodyboarding the fast-paced exhilarating sport it has become.

Even a bottom surface which is made of flat, slick plastic does produce noticeable drag between the board and water which can slow the bodyboard. One theory to explain the drag is that the flat, wet bottom surface includes water molecules which cling to the board, causing shear between the moving and non-moving water molecules as the board passes through the water. The drag produced is not great, but does result in a noticeable, effect on bodyboard performance. Bodyboard riders describe the characteristic feel or sensation of a typical prior art board passing through the water as "carving" or "slicing" through the water, as opposed to frictionless movement over the water.

It would be advantageous to further enhance the performance of bodyboards by reducing bottom surface drag. In particular, it would be advantageous to reduce bottom surface drag on bodyboards, thereby improving the speed and performance of bodyboards, by employing a new type of textured bottom surface skin. It would also be advantageous to provide a method of producing the improved, drag-reducing bottom skin for bodyboards.

Accordingly, the present invention provides an improved bottom surface for bodyboards of the type used to ride on waves such as ocean surf. Such bodyboards are in the form of an elongate, substantially planar board having a foam core, a top surface for supporting a rider, and a bottom surface for planing on water. The bottom surface of the board, incorporating the improved skin of the present invention, comprises a plurality of discreet depressions formed on the bottom surface of the board, the number of such depressions exceeding approximately 50 depressions over selected regions of the bottom surface of the board. The depressions enhance the planing of the bodyboard on water. At least one theory explaining the enhancement produced by the depressions is that the textured bottom surface causes air bubbles to become trapped between the bottom surface of the board and the water, resulting in "air lubrication" of the bottom surface as the bodyboard moves through the water.

The present invention further includes an improved bottom skin for use on bodyboards of the type which are in the form of an elongate, semi-rigid foam plank having a top riding surface for supporting a rider and a bottom surface for planing on water. The bottom skin of the bodyboard substantially covers the bottom of the board and forms its bottom planing surface. The improved bottom skin comprises an expanse of thermoplastic sheet material in which a plurality of discreet depressions are formed. The density of depressions preferably exceeds approximately 8 depressions per-square-foot.

The invention further includes a method of forming an improved bottom skin for use on bodyboards used to ride on waves such as ocean surf. The bottom skin is formed from an expanse of thermoplastic sheet material overlying an adjacent layer of semi-rigid foam. Steps in the method comprise heating the thermoplastic sheet material until the material is deformable or moldably plastic. A subsequent step is impressing the sheet material, while in the moldably plastic state, with a plurality of convex, depression-forming projections or elements. The density of projections used in the impressing step exceeds approximately 8-projections per-square-foot and results in a corresponding reverse-pattern which includes a plurality of discreet depressions on the bottom skin. Finally, the thermoplastic bottom skin sheet material is allowed to cool until it has set with the projections formed therein.

DETAILED DESCRIPTION OF THE PREFERRED EMBODIMENT

The present invention provides an improved bottom surface for a bodyboard used to ride on waves such as ocean surf. A bodyboard including a textured bottom skin on the bottom of the board will first be described, followed by a description of a preferred method of forming the textured bottom skin.

Figure 1:
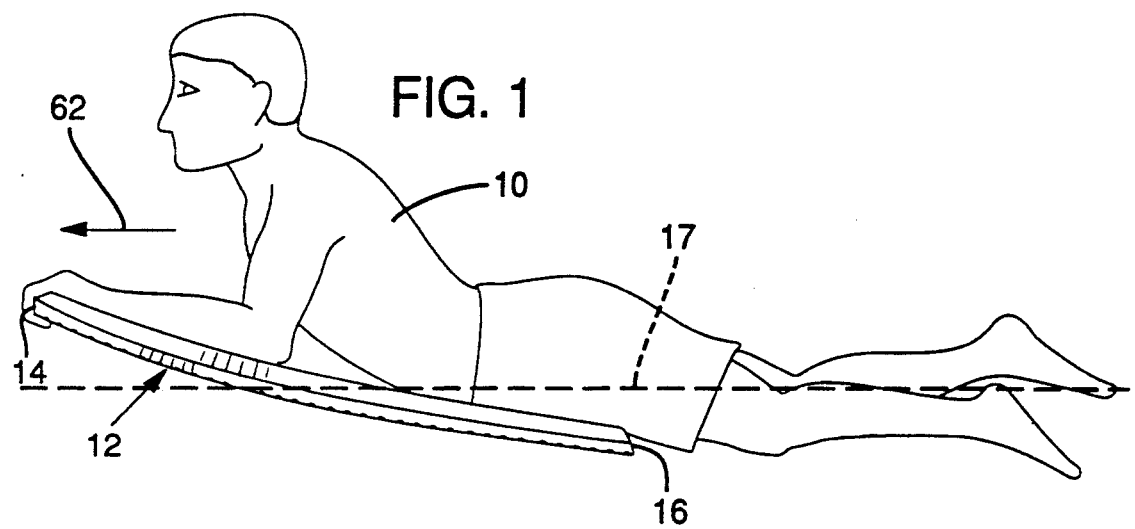
FIG. 1 is a partially schematic, side view of a bodyboard rider in a typical riding position on a bodyboard which includes the textured bottom skin of the present invention.

FIG. 1 shows a bodyboarder 10, also referred to as a bodyboard rider 10 riding a bodyboard 12 in a typical riding position. The rider is positioned on the top of board 12 in a prone or procumbent position, partially propped up on the elbow of one arm with at least one hand gripping the front or nose end 14 of board 12. The rider's body extends beyond the tail or rear end 16 of the board with the rider's legs trailing the board in the water 17. The bodyboard is steered or maneuvered by the rider leaning, manipulating and twisting the board, and use of the rider's legs.

Figure 2:
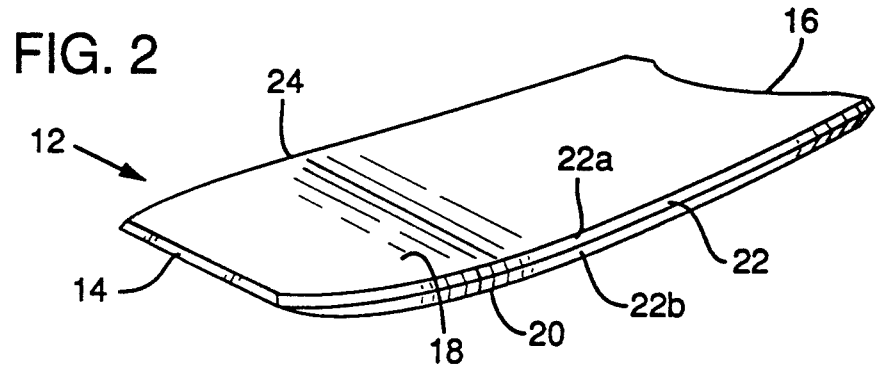
FIG. 2 is a perspective view of the bodyboard of FIG. 1 as viewed from the front left corner of the bodyboard.
Figure 3:
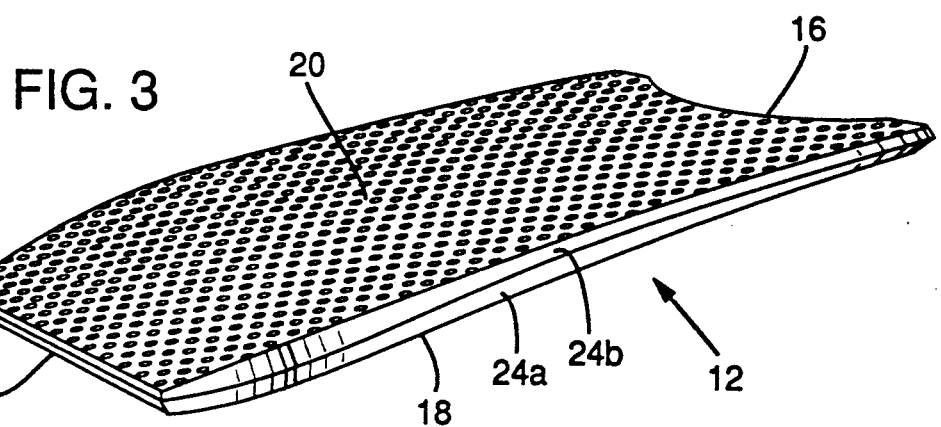
FIG. 3 is an enlarged perspective view of the bodyboard of FIG. 2, inverted from the position shown in FIG. 2, showing the textured bottom surface of the present invention.

FIGS. 2 and 3 further illustrate the structure of bodyboard 12. In form, the bodyboard is an elongate, semi-rigid foam plank having a top riding surface 18 for supporting a rider and a bottom surface 20 for planing on water. The structure produces an elongate, substantially planar board which is typically approximately 4-feet in length and 2-inches to 3-inches in thickness at the midpoint or center of the board. The thickness of the board tapers downwardly to a smaller thickness adjacent nose end 14. At the heart of the bodyboard is an elongate, substantially planar foam core made of a closed cell expanded polyolefin foam, preferably of a type specially fabricated for use in bodyboards. The preferred foam for use in the core of board 12 is called Wavecore (trademark), which is a high quality Ethafoam ® product made by Dow Chemical Company.

Top surface 18 and bottom surface 20 are generally parallel to one another except near nose end 14 where they taper toward one another. Top surface 16 curves upward slightly from the midpoint of the board toward the nose and tail ends. Bottom surface 20 also curves upwardly, generally parallel with top surface 18 near tail end 16, and curves up a somewhat greater amount toward nose end 14. Thus, bottom surface 20 has an upwardly curving planing surface near nose end 14, defining what is called a nose rocker. The upward curvature of the forward end of the bodyboard helps keep the nose of the board from becoming buried in the water as the board is ridden. In other words, the forward rocker helps ensure that the board stays on top of the water as it moves through the surf, as shown in FIG. 1. Board 12 also includes longitudinally-extending side edges 22, 24 which curve toward one another by a lesser amount adjacent the tail end and a greater amount adjacent the nose end of the board (see FIG. 8). A forward-arching concave indentation is formed at the rear or tail end 16, defining what is known as a swallow tail. Side edges 22, 24 of bodyboard 12 are each beveled to define an outwardly-extending triangular shape. Upper beveled edges 22a, 24a form what are known as chines and lower beveled edges 22b, 24b form what are known as side rails. Swallow tail 16 is sometimes also beveled.

Figure 5:
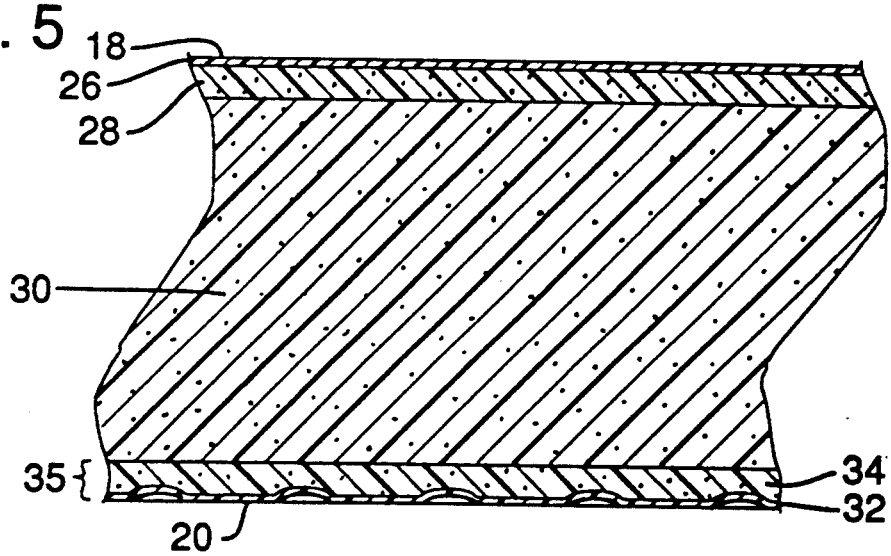
FIG. 5 is a cross-sectional view, taken along line 5—5 of FIG. 4, illustrating the layered construction of the bodyboard of FIGS. 1-3.

The outer skin of bodyboard 12 includes one or more top skin layers, the outermost of which defines top surface 18 of the board. Referring to FIG. 5, top skin layer 26 is a thin layer of foam, such as closed cell expanded polyolefin foam, which is preferably one-quarter-inch or less in thickness and overlies semi-rigid foam core 30, which is at the heart of the bodyboard structure. The illustrated embodiment of bodyboard 12 includes a second or intermediate foam layer 28, like top foam skin 26, extending between the semi-rigid foam core 30 and top skin 26. Foam layers 26, 28, 30 are bonded to one another, preferably by a heat and adhesive process known as thermolamination. The outer skin of the bodyboard also includes an outer layer of closed cell expanded polyolefin foam covering chines 22a, 24a and rails 22b, 24b (see FIGS. 2 and 3). The tail end 16 is also usually covered with a tail-piece made of closed cell expanded polyolefin foam. The chines, rails and tail-piece are all bonded to the foam core of the bodyboard, or to one or more intermediate layers which are, in turn, bonded to foam core 30, by means of thermolamination.

The bottom skin of the bodyboard includes a thin layer of thermoplastic sheet material 32 (see FIG. 5) which defines and forms bottom surface 20. Sheet material 32 has a thickness of between about 15-mils (thousandths of an inch) and about 50-mils, with the preferred thickness of the sheet material 32 being approximately 25-mils. The thermoplastic sheet material 32 provides a non-foam planing surface that is tough and flexible. The preferred thermoplastic sheet material for bottom skin 32 is Surlyn ®, a plastic product made by DuPont. In the preferred embodiment, Surlyn ® layer 32 forms the outer layer of a multilayered bottom skin on bodyboard 12, the bottom skin further including a foam backing layer 34 bonded to the Surlyn ®. Backing layer 34 is preferably made of expanded polyolefin foam, Ethafoam ® or the like. The backing foam layer is generally one-quarter-inch or less in thickness. Both the Surlyn ® outer skin layer 32 and backing foam layer 34 are bonded together by the manufacturer and supplied as a unit to the bodyboard manufacturer. The outside surface of the outer Surlyn ® skin layer 32 forms the bottom surface 20 of bodyboard 12 in which the texturing of the present invention is formed.

Referring to FIGS. 3, 4, 5 and 7, bodyboard 12 includes a plurality of discreet depressions formed in the bottom surface of the board. Depressions 40 are small, circular concavities also called dimples. Each depression extends inwardly into the bottom surface. The diameter 36 of each circular depression (see FIG. 4) is between about 0.15-inch and 1.5-inch, with the preferred diameter 36 for each depression being approximately 0.25-inch. That means each depression covers an area of between about 0.02-square inches and about 1.75-square inches, with the preferred area of each depression being approximately 0.05-square inches. The separation 42 or spacing between the centers 38 of adjacent depressions preferably exceeds twice the diameter 36 of a depression 40. For example, if depressions 40 have a diameter 36 of approximately 0.25-inch, the spacing 42 between the centers 38 of adjacent depressions should exceed 0.5-inch. In the preferred embodiment, the spacing 42 between the centers 38 of adjacent depressions is approximately 0.75-inch. Correspondingly, the distance 44 between the outer edges of adjacent depressions 40 is at least 0.25-inch, and in the preferred embodiment is approximately 0.5-inch.

The depth 46 (see FIG. 7) of each depression 40 is preferably between about 10-mils and about 100-mils, with the preferred depth of a depression being approximately 35-mils. That means that each depression 40 has a depth which generally equals or perhaps exceeds the thickness of Surlyn ® outer skin layer 32. In order to accommodate such a configuration of outer skin thickness and depressions 40, the depressions are molded into the Surlyn ® layer 32 by deforming the Surlyn ®. In other words, Surlyn ® layer 32 is shaped or plasticly molded to create depressions 40, by a process described below. The space or volume of depressions 40 is taken up by compression of the foam backing layer 34 beneath each depression. The Surlyn ® is thus deformed into the yieldable foam backing layer of bottom skin 35.

In cross-section, each depression 40 has a concave bottom 45 which is generally spherical, having a spherical radius R (see FIG. 7) which generally exceeds the depth 46 of the depression. The result is a shallow circular, half-lens-shaped concavity. A method for creating depressions 40 will be described below in connection with the description of the method of forming bottom skin 20.

Figure 8:
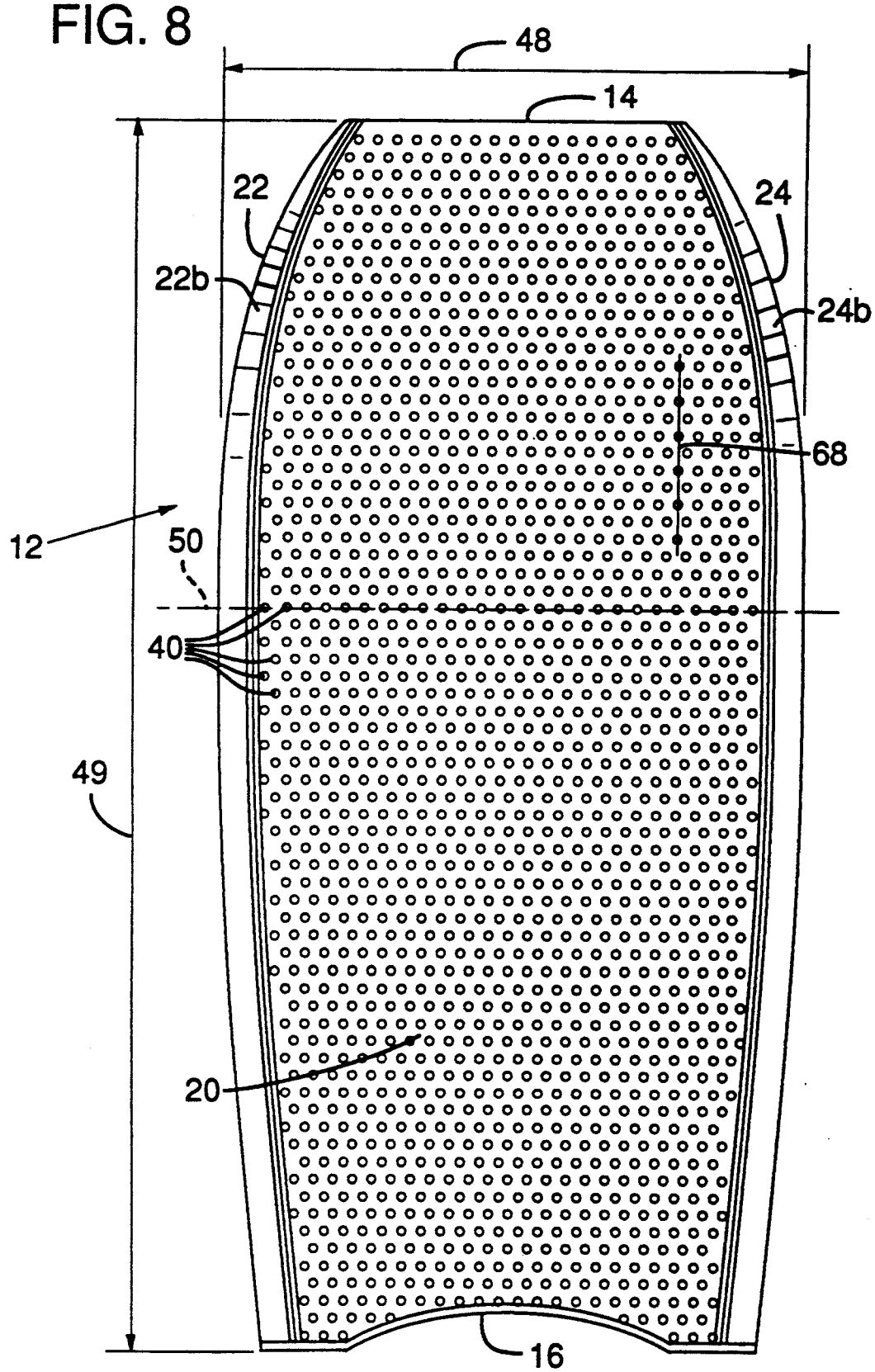
FIG. 8 is a bottom plan view of the bodyboard of FIGS. 1-3 showing the textured bottom surface of the present invention and further illustrating the pattern of depressions used in the preferred embodiment of the invention.

The number of discreet depressions 40 formed on bottom surface 20 should exceed approximately 50-depressions over the entire bottom surface of the bodyboard. That number of depressions, and preferably a greater number, is needed to produce the air lubrication effect which helps lift and lubricate the bodyboard as it passes through water. Since a typical bodyboard has an overall length 47 (see FIG. 8) of between about 3.5-feet and about 4-feet and an overall width 48 of between about 1.5-feet and about 2-feet, the surface area of bottom surface 20 is generally between about 5-square-feet and about 8-square-feet. For the purposes of subsequent analyses relating to the bottom surface area of bodyboard 12, a total surface area of 6-square-feet will be assumed. Since the number of depressions exceeds approximately 50-depressions over the entire bottom surface of the bodyboard, the density of depressions (meaning the number of depressions per unit area of the bottom surface) exceeds approximately 8-depressions per-square-foot. Preferably, a larger number of depressions will be employed on bottom surface 20 because more depressions increase the air lubrication effect of the invention, described more fully below. As shown in FIG. 8, approximately 1750 depression are provided on the bottom surface of the preferred embodiment of bodyboard 12, which calculates to a density of approximately 292-depressions per-square-foot.

Figure 4:
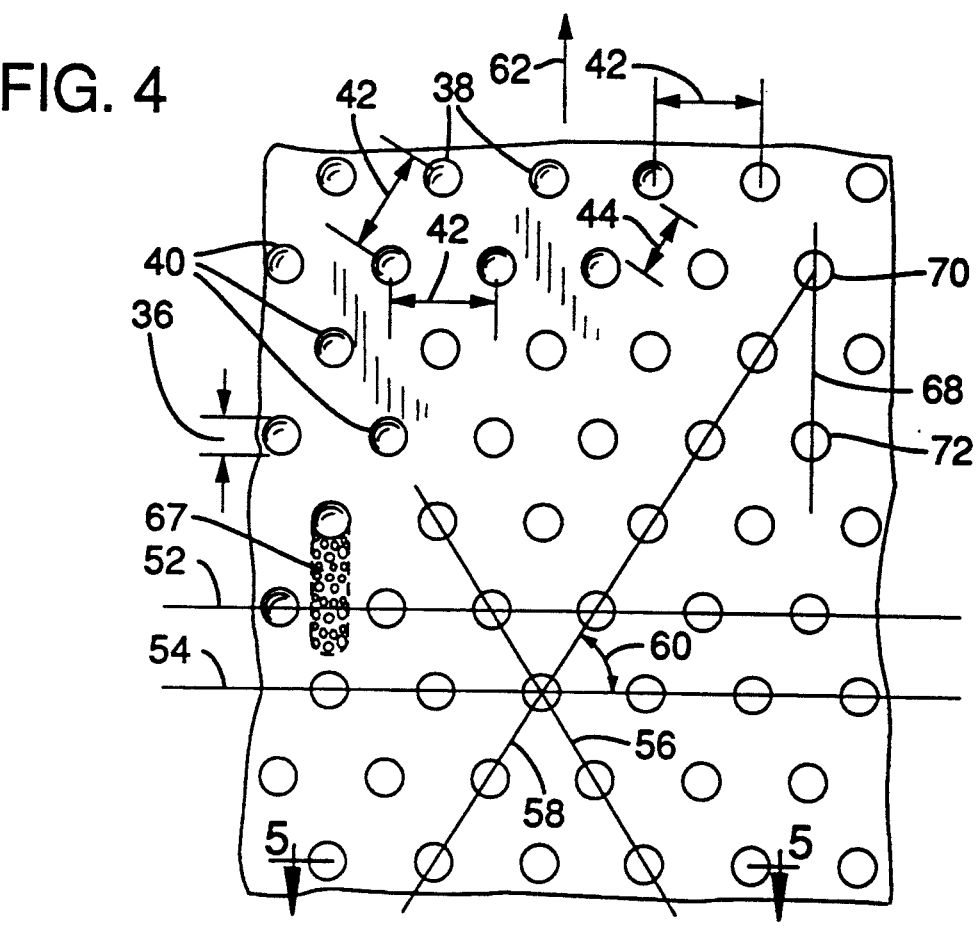
FIG. 4 is an enlarged bottom plan view of a portion of the bottom skin of the bodyboard shown in FIGS. 3 and 8.

A section of the preferred pattern of depressions 40 on bottom surface 20 is shown in FIG. 4, and the entire pattern is shown in FIG. 8. The preferred pattern of depressions 40 on bottom surface 20 includes an arrangement of the depressions into a plurality of substantially parallel, laterally-extending transverse lines of spaced-apart depressions extending across the width of the bottom surface of the bodyboard. An example of such a laterally-extending transverse line of depressions is illustrated at 50 in FIG. 8. Line of depressions 50 extends across the width of bottom surface 20 between sides 22 and 24. An equivalent line of depressions is shown at 52 in FIG. 4. Referring to FIG. 4, line of depressions 52 and the next adjacent line of depressions 54 are parallel to one another. Both lines 52 and 54 extend laterally across the width of the bodyboard, in the same direction as transverse line 50 in FIG. 8. The depressions 40 in line 52 and the depressions 40 in adjacent transverse line 54 are laterally offset from one another, or staggered relative to one another. Preferably, the depressions in adjacent transverse lines of depressions are positioned midway between the depressions in the other adjacent transverse line. In other words the depressions in line 52 are midway between the depressions in line 54, and vice versa. This pattern can also be termed a hexagonal pattern, in that straight lines of depressions extend transversely across the width of the bodyboard, such as lines 52 and 54, and also extend diagonally, such as lines 56 and 58. At each intersection point between the straight lines of depressions 40 on bottom surface 20, the lines are displaced from one another by angles of 60°, an example being angle 60 in FIG. 4.

Figure 6:
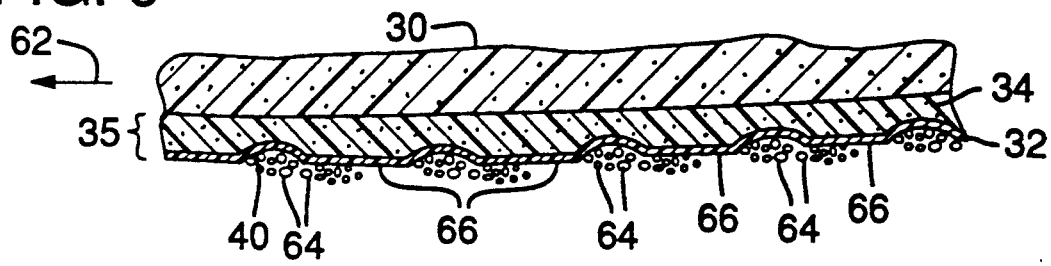
FIG. 6 is a partial, side cross-sectional view of the lower part of the bodyboard section shown in FIG. 5, on an enlarged scale, illustrating one theory of how the textured bottom surface produces air lubrication of the bottom surface to enhance the planing of the bodyboard on water.

The pattern of depressions on bottom surface 20 produces a lubricating effect which enhances the planing of the bodyboard on water. It is theorized that this lubricating effect is caused by air bubbles, or trapped air pockets, which develop between the bottom surface of the bodyboard and the water. Referring to FIG. 6, one possible mechanism for the air lubrication effect produced by the textured bottom surface of the present invention is that the water and air mixture which is present beneath the bodyboard, is churned or agitated by the depressions. If the bodyboard is moving in the direction of arrow 62, shown in FIGS. 1, 4 and 6, a mixture of air and water is constantly passing beneath bottom surface 20, as the board moves through the water. Some of the air which passes beneath the raised nose 14 tends to collect as bubbles within depressions 40, and the bubbles then tend to disperse over the bottom surface 20. As the board moves in direction 62, the bubbles emerge from the depressions and trail behind each depression, as shown with bubbles 64 in FIG. 6. The bubbles thus pass over the flat regions 66 extending between and around each depression as they trail behind the depressions. A trailing pattern of bubbles is indicated in FIG. 4 at 67, trailing behind depression 65. Naturally, as each depression in the pattern which extends over the entire bottom surface of the bodyboard generates a trail of bubbles similar to trail 67, virtually the entire bottom surface becomes covered with bubbles. Assuming this theory is the actual mechanism which produces the air lubrication effect of the present invention, it is believed that the bubbles which extend along the bottom surface of the bodyboard help to reduce shear forces in the water beneath the bodyboard, thereby reducing drag as the bodyboard moves through the water.

One of the reasons for the staggered or offset pattern of depressions 40 shown in FIGS. 4 and 8 is that it maximizes the longitudinal distance between depressions in the direction in which the bubbles travel. The longitudinal distance between depressions is the lengthwise distance along the length of the bodyboard. Referring to FIGS. 4 and 8, a longitudinally-extending line along bodyboard 12 is indicated at 68. In FIG. 4, The forward depression along indicated line 68 is depression 70. Bubbles generated through turbulence or agitation of the air-water mixture within depression 70 will stream along longitudinal line 68 as the bodyboard moves in direction 62. Such bubbles will encounter the next depression at 72, two lateral lines back from depression 70. The staggered pattern of depressions increases the flat portion of bottom surface 20 between depressions, in the longitudinal direction, thus giving the bubbles trailing behind each depression additional flat surface area to move over before encountering a subsequent depression. That, in turn, tends to maximize the coverage of the bottom surface by bubbles generated in each depression.

Figure 7:
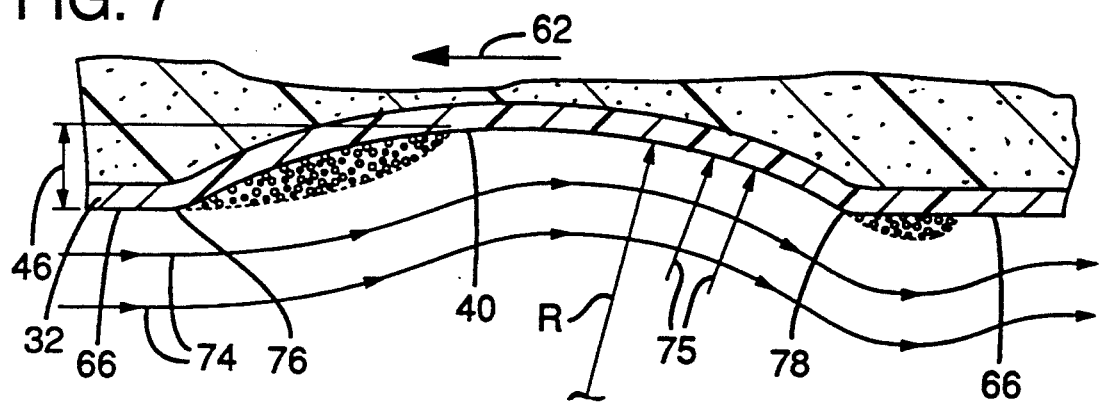
FIG. 7 is an enlarged side, cross-sectional view of a single depression, as shown in FIG. 6, further illustrating a theory of how the textured bottom surface of the present invention enhances the planing of the bodyboard on water.

An additional theory of why depressions 40 produce lift as well as air lubrication on the bottom surface of the bodyboard is illustrated in FIG. 7. Assuming the bodyboard is moving in direction 62, the relative motion of the water against bottom surface 20 is illustrated by arrows 74. As the bodyboard travels forwardly through the water, air pockets develop both behind the leading edge of depression 40, at 76, and just past the trailing edge of depression 40, at 78. The water flow 74 adjacent bottom surface 20 passes beneath the generally flat portions 66 of the bottom surface and upwardly into depression 40. Some of the flow impinges against the central and trailing surfaces of depression 40 before exiting the depression past trailing edge 78. The slight upward flow of water tends to push upwardly against the bodyboard, indicated by arrows 75, and create lift. The air pockets behind edges 76 and 78 contribute to lift on the bottom surface of the bodyboard and also distribute bubbles in the manner indicated in FIG. 6.

While these theories are suggested as possible explanations for the lift and lubrication effects produced by depressions 40 the plurality of depressions 40 do produce a noticeable lifting and lubricating effect regardless of the actual mechanism of the phenomenon. Experienced bodyboard riders detect a sensation of the bodyboard floating more lightly on the water as they ride the waves on bodyboards which incorporate the pattern of depressions of the present invention. There is also a noticeable increase in the speed of the bodyboard. As noted above, the phenomenon is called air lubrication and is believed to result from air bubbles or pockets helping to reduce the sheer forces in the water as the board travels through the surf.

Figure 9:
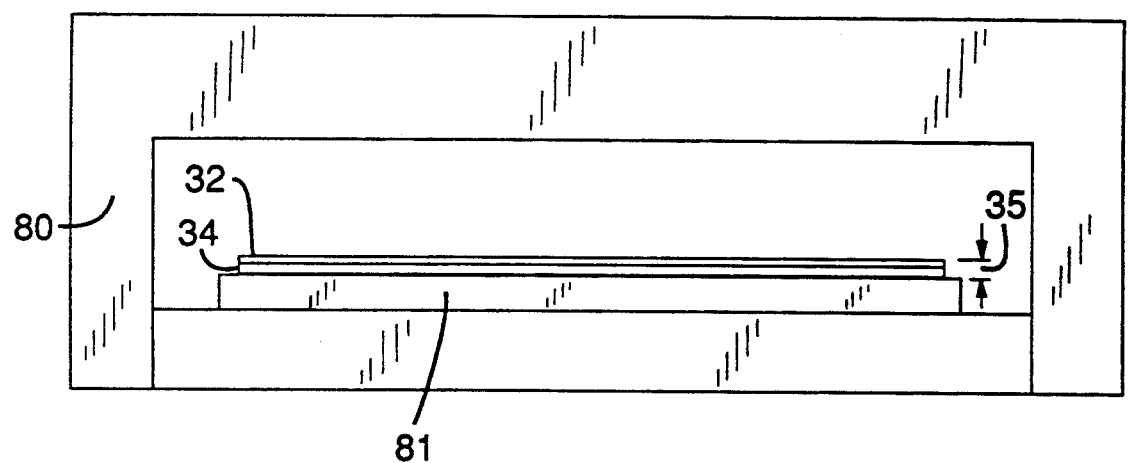
FIG. 9 is a schematic view of the heating step used in the method of making the textured bottom skin for bodyboards.

While depressions 40 can be created in bottom surfaces of various kinds, the preferred system for providing the plurality of discreet depressions in accordance with the present invention is to fabricate the bodyboard with a pre-formed bottom skin layer which incorporates depressions 40. The improved bottom skin 35 of the present invention is shown in cross-section in FIGS. 5, 6 and 7, and in plan view in FIG. 8, and includes an expanse of thermoplastic sheet material, such as Surlyn ® layer 32, backed by a layer 34 of foam, as described above. That bottom skin is produced by the preferred method of the present invention, which includes steps shown schematically in FIGS. 9 and 10. The method starts with an expanse of thermoplastic sheet material such as Surlyn ®, without depressions, which overlies an adjacent layer of semi-rigid foam, such as layer 34 or foam core 30. The method for creating the plurality of depressions 40 in the Surlyn ® layer of bottom skin 35 includes the steps described below.

The first step in the method of forming the depressions is to heat the thermoplastic sheet material 32, preferably together with foam backing layer 34, in an oven 80 to make the thermoplastic sheet material moldably plastic, meaning it is heated sufficiently to reach a plastic, formable, moldable state. Oven 80 must be large enough to accommodate one or more continuous sheets of raw (i.e., unformed, or without depressions) bottom skin material 35. Since each piece of bottom skin material must be large enough to cover the entire bottom surface of the bodyboard, it will have a size of approximately 2-feet in width and 4-feet in length. Consequently, oven 80 must be large enough to accommodate a sheet of flat bottom skin material that size. The preferred temperature of oven 80 is 350° Fahrenheit, and the bottom skin material 35, including both layers 32 and 34, is placed in the oven on a suitable support plate 81 and heated for approximately 48 seconds. That sufficiently softens the Surlyn ® to where it can be permanently impressed with the pattern of depressions in the following step.

Figure 10:
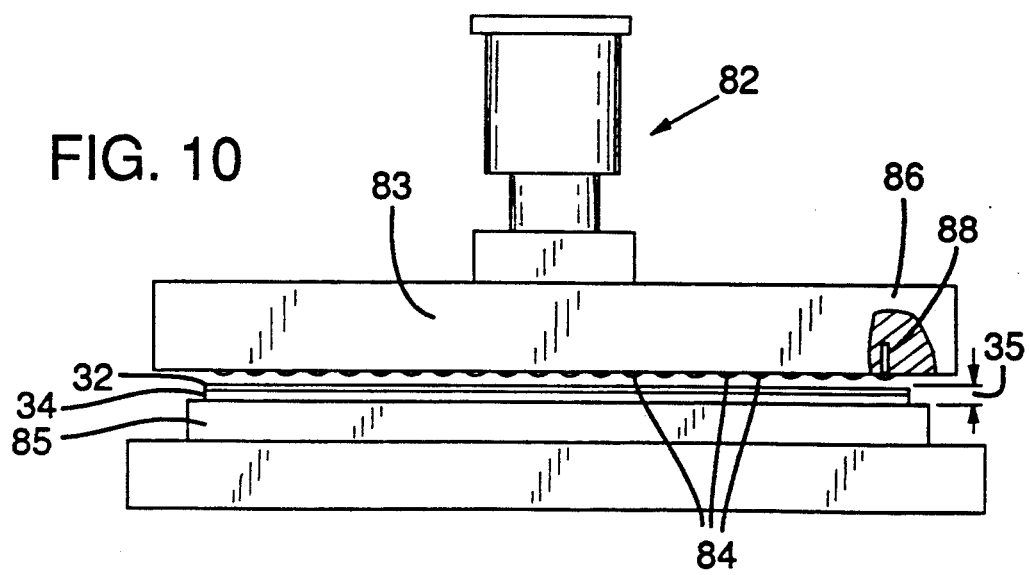
FIG. 10 is a schematic illustration of the impressing step in the method of the present invention.

The next step in the process, shown in FIG. 10, is to impress a reverse pattern of the depressions into the softened raw bottom skin material 35 immediately after the heating step. The preferred device for performing the impressing step is depicted schematically in FIG. 10. It is a hydraulic press 82 which includes a broad, flat plate 83, larger in length and width than the piece of bottom skin material 35 being prepared. A suitable support table 85 beneath press 82 is used to support the sheet of bottom skin material 35. On the underside of movable press plate 83 is a reverse-pattern of the pattern of depressions shown in FIG. 8. A plurality of depression-forming projections 84 (illustrated schematically in FIG. 10) is provided on the bottom side of plate 83. Conventional round-head rivets, having heads approximately ¼-inch in diameter, are used for the depression-forming projections. The shank portion 88 of each rivet is installed in a cooperating hole extending through plate 83. The rivet heads have been found to be an effective, inexpensive means of forming the pattern of depressions. Alternatively, suitable round-headed bolts or the like may be substituted for rivets 84, as desired. During the pressing step, press 82 is used to move plate 83, containing the pattern of rivets on the underside, into contact with the heated raw (i.e., flat, without depressions) bottom skin material 35, with sufficient force to form the plurality of depressions 40.

Movement of the heated bottom skin material 35 between oven 80 and press 82 may be accomplished by any suitable means, such as a conveyor (not shown). The heated bottom skin material 35 must be moved into position beneath the press relatively quickly, before the thermoplastic material loses its moldability. Once positioned beneath press 83, the reverse-depression pattern of depression-forming projections on the underside of movable press plate 83 is pressed onto the thermoplastic sheet material with a force of approximately 25 tons for approximately 48 seconds. The 25 ton pressure exerted by press 82 on bottom skin material 35 is the pressure exerted over the entire surface area of the 8-square-foot piece of skin material. That calculates as a pressure of approximately 44 pounds-per-square-inch (psi). If the pattern of rivets on the underside of movable press plate 83 extends over only the 6-square-foot area of the bottom surface of a bodyboard, meaning the pattern is pressed only on part of the piece of raw bottom skin material corresponding to the shape of the bottom surface shown in FIG. 8, the 25 tons of pressure is slightly more concentrated. Twenty-five tons pressure exerted over a 6-square-foot area calculates to a pressure of approximately 58-psi. The pressure required to impress the pattern of depressions into bottom skin 35 is preferably in the range of between about 10-psi and 80-psi.

Following the impressing step using the apparatus of FIG. 10, the thermoplastic sheet material is allowed to cool sufficiently to retain the impressed pattern of depressions, after which it can be installed on the bottom of a bodyboard to form the bottom surface of the present invention. Installation of a sheet of bottom skin material 35 impressed with the pattern illustrated in FIG. 8 will usually be accomplished by thermolaminating the foam backing layer onto the foam core 30 of the bodyboard. Excess bottom skin material is trimmed away either before or after installation on the foam core.

The textured bottom skin of the present invention, incorporating a plurality of discreet depressions on the bottom surface of a bodyboard numbering at least 50 depressions, and preferably more, has been found to enhance the planing of the bodyboard on water. It tends to reduce drag and increase the speed of the bodyboard. It also gives the bodyboard a more buoyant, lighter "feel" when contrasted with the feel of a bodyboard which has a conventional bottom skin. The pattern of staggering the depressions in adjacent longitudinal rows is believed to maximize the benefits produced by the plurality of depressions.

Alternative embodiments of the invention, including alterations in the number and pattern of depressions formed in the bottom surface and on the bottom skin are possible within the scope of the present invention. The total number of depressions over the bottom surface should exceed approximately 50 depressions, but it is not necessary that the depressions be spread evenly over the entire bottom surface of the bodyboard. For example, although the preferred embodiment of the invention as depicted in the figures shows a regular pattern of depressions over the entire bottom surface of a bodyboard, the depressions could be localized into the regions of the bodyboard where planing on the water occurs, namely, the rear two-thirds to one-half of the bodyboard. The pattern of depressions depicted in FIGS. 4 and 8, while believed to be advantageous in enhancing the planing characteristics of the bodyboard, may also be modified within the scope of the present invention. For example, the staggering of the depressions in adjacent lateral rows of depressions need not necessarily use a pattern which repeats every other row. Instead, the pattern of staggered depressions may repeat every third or fourth row and still function as described above. The depressions need not necessarily be circular, although they should be in the size ranges discussed in the specification above. Irregular-shaped depressions may be found to function as well as circular depressions.

While the bottom skin material of the invention described above provides a bodyboard with a bottom surface covered with a plurality of depressions or indentations which serve to churn or agitate the air-water mixture beneath the bodyboard, other types of textured bottom surfaces may also produce the air lubrication effect. For example, instead of employing indentations, cavities or depressions which extend into the relatively flat expanse of the bottom surface of the bodyboard, a pattern of projections may produce an equivalent lubricating effect. In essence, such a pattern would be a reversal of the pattern depicted in the preferred embodiment described above. Instead of indentations or depressions 40, the circular texturing elements would be small, relatively short projections which extend outwardly from the relatively flat expanse of the bottom surface. Such a modification of the present invention is also suggested by the disclosure provided herein.

While the present invention has been shown and described with reference to the foregoing preferred embodiment, it should be apparent to those skilled in the art that other changes in form and detail may be made without departing from the scope and spirit of the invention as described in the appended claims.

What is claimed is:

1. In a bodyboard used to ride on waves, the bodyboard being in the form of an elongate, substantially planar board having a foam core, having a top surface for supporting a rider, and a bottom surface for planing on water, the improvement comprising:

a plurality of discrete, generally circular depressions formed in selected regions on the bottom surface of the board, the number of depressions exceeding approximately 50, each depression having a diameter in the range of 0.15-inch to 1.5-inch, and the depressions being separated from one another by generally flat regions of the bottom surface which extend between and around the depressions, the density of depressions per unit area of the bottom surface being in the range of 8-depressions per-square-foot to 1840-depressions per-square-foot, whereby the depressions trap air bubbles and produce a flow of bubbles over the flat regions of the bottom surface between the depressions which lubricates the movement of the bodyboard as the bottom surface planes on water.

2. A bodyboard as in claim 1 in which the bottom surface of the bodyboard is substantially covered with thermoplastic sheet material, the plurality of depressions being formed in the sheet material.

3. A bodyboard as in claim 2 in which the thermoplastic sheet material has a thickness in the range of 15-mils to 50-mils and each depression covers an area in the range of 0.02-square inches to 1.75-square inches and has a depth in the range of 10-mils to 100-mils.

4. A bodyboard as in claim 3 in which the thermoplastic sheet material forms the outer layer of a multi-layered bottom skin on the bodyboard, the bottom skin further including a foam backing layer bonded to the sheet material.

5. A bodyboard as in claim 4 in which the foam backing layer of the bottom skin is formed of expanded polyolefin foam having a thickness in the range of 1/16-inch to ½-inch.

6. A bodyboard as in claim 1 in which each depression has an area in the range of 0.02-square inches to 1.75-square inches.

7. A bodyboard as in claim 1 in which the depressions are formed in a regular pattern extending over the entire bottom surface of the bodyboard.

8. In a bodyboard used to ride on waves, the bodyboard being in the form of an elongate, substantially planar board having a foam core, having a top surface for supporting a rider, and a bottom surface for planing on water, the improvement comprising:

a plurality of discrete, generally circular depressions formed in the bottom surface of the board, the number of depressions exceeding approximately 50, each depression having a depth in the range of 10-mils to 100-mils and a diameter in the range of 0.15-inch to 1.5-inch, and the depressions being separated from one another by flat regions of the bottom surface which extend between and around the depressions, whereby the depressions enhance the planing of the bodyboard on water.

9. A bodyboard as in claim 8 in which the depressions are spaced apart from one another, the spacing between the centers of adjacent depressions exceeding twice the diameter of a depression.

10. A bodyboard as in claim 9 including a pattern of the depressions which includes a plurality of substantially parallel, laterally-extending transverse lines of the spaced-apart depressions extending across the width of the bottom surface of the bodyboard, the depressions in adjacent transverse lines of depressions being laterally offset from one another.

11. A bodyboard as in claim 10 in which the lateral position of the depressions in adjacent transverse lines of depressions is midway between the depressions in the other adjacent transverse line.

12. Bottom skin for a bodyboard used to ride waves the bodyboard being in the form of an elongate, semi-rigid foam plank having a top riding surface for supporting a rider and a bottom surface for planing on water, the bottom skin substantially covering the bottom of the bodyboard and forming its bottom surface, the bottom skin comprising:

an expanse of thermoplastic sheet material, a plurality of generally circular depressions having a diameter in the range of 0.15-inch to 1.5-inch formed in the sheet material, the area of each depression being in the range of 0.02-square inches to 1.75-square inches, the depressions being separated from one another by flat regions of the bottom surface which extend between and around the depressions, and the density of depressions being greater than approximately 8-depressions per-square-foot and less than 1840-depressions per-square-foot, whereby the depressions in the bottom skin enhance the planing of the bodyboard on water.

13. Bottom skin for a bodyboard as in claim 12 in which the thermoplastic sheet material has a thickness in the range of 15-mils to 50-mils, and each depression has an area in the range of 0.02-square inches to 1.75-square inches.

14. Bottom skin for a bodyboard used to ride waves, the bodyboard being in the form of an elongate, semi-rigid foam plant having a top riding surface for supporting a rider and a bottom surface for planing on water, the bottom skin substantially covering the bottom of the bodyboard and forming its bottom surface, the bottom skin comprising:

an expanse of thermoplastic sheet material, and a plurality of depressions formed in the sheet material separated from one another by generally flat regions of the sheet material which extend between and around each depression, the density of depressions exceeding approximately 8-depressions per-square-foot, in which each depression is generally circular, having a depth in the range of 10-mils to 100-mils and a diameter in the range of 0.15-inch to 1.5-inch, and the spacing between the centers of adjacent depressions exceeds twice the diameter of the depressions, whereby the depressions in the bottom skin trap and distribute air bubbles over the flat regions of the bottom skin between the depressions to enhance the planing of the bodyboard on water.

15. In a bodyboard used to ride on waves, the bodyboard being in the form of an elongate, substantially planar board having a foam core, having a top surface for supporting a rider, and a bottom surface for planing on water, the improvement comprising:

a plurality of circular discrete depressions formed in the bottom surface of the board, each depression having a diameter in the range of 0.15-inch to 1.5-inch, the number of depressions exceeding approximately 50, the depressions being separated from one another by flat regions of the bottom surface which extend between and around the depressions and the density of depressions per unit area of the bottom surface being greater than approximately 8-depressions per-square-foot and less than approximately 1840-depressions per-square-foot, whereby air bubbles are collected by the depressions and distributed over the flat regions of the bottom surface between the depressions to lubricate the movement of the bodyboard as it planes on water.

16. A bodyboard as in claim 15 in which each depression has an area in the range of 0.02-square inch to 1.75-square inch.

17. A bodyboard as in claim 16 in which each depression has a depth in the range of 10-mils to 100-mils.

18. A bodyboard as in claim 15 in which the depressions are formed in a regular pattern extending over the entire bottom surface of the bodyboard.

* * * * *